(12) United States Patent
Kamimae et al.

(10) Patent No.: US 7,069,736 B2
(45) Date of Patent: Jul. 4, 2006

(54) AIR CONDITIONING APPARATUS FOR HYDRAULIC SHOVEL

(75) Inventors: Takeshi Kamimae, Kawagoe (JP); Kunio Ui, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/805,619

(22) Filed: Mar. 18, 2004

(65) Prior Publication Data

US 2004/0194488 A1 Oct. 7, 2004

(30) Foreign Application Priority Data

Apr. 4, 2003 (JP) ............................. 2003-102159

(51) Int. Cl.
*B60H 1/32* (2006.01)
(52) U.S. Cl. ...................... 62/244; 165/42; 237/12.3 B
(58) Field of Classification Search ................. 62/239, 62/244; 165/42, 43; 237/12.3 A–12.3 B; 454/156
See application file for complete search history.

(56) References Cited

U.S. PATENT DOCUMENTS

| | | | | |
|---|---|---|---|---|
| 2,052,471 A | * | 8/1936 | Hula | ....................... 296/146.8 |
| 3,841,108 A | * | 10/1974 | Pierrat | ........................... 62/236 |
| 4,133,574 A | * | 1/1979 | Martin | ................... 296/190.09 |
| 4,344,356 A | * | 8/1982 | Casterton et al. | ............ 454/139 |
| 5,119,718 A | * | 6/1992 | Wagner et al. | ............... 454/158 |
| 5,351,884 A | * | 10/1994 | Kadotani et al. | ........ 237/12.3 A |
| 5,826,440 A | * | 10/1998 | Okada et al. | ................... 62/239 |
| 6,126,539 A | * | 10/2000 | Miller et al. | ................. 454/144 |
| 6,129,056 A | | 10/2000 | Skeel et al. | |
| 6,290,286 B1 | * | 9/2001 | Murakami et al. | ...... 296/190.09 |

FOREIGN PATENT DOCUMENTS

| | | |
|---|---|---|
| JP | 53-52549 | 5/1978 |
| JP | 8-183323 A | 7/1996 |
| JP | 2001-55760 A | 2/2001 |

* cited by examiner

*Primary Examiner*—William E Tapolcai
(74) *Attorney, Agent, or Firm*—Frishauf, Holtz, Goodman & Chick, P.C.

(57) ABSTRACT

An air conditioning apparatus for a hydraulic shovel with which a wide space in a cab can be secured and a placement operation of ducts for distributing wind to each important point in the cab is facilitated. For this purpose, in the air conditioning apparatus, an air-conditioning unit (21) is placed at a front portion of a right side in a cab (10). The air-conditioning unit (21) is mounted to a front portion of a right side wall surface (51) of the cab (10). The air-conditioning unit (21) is mounted to the right side wall surface (51) of the cab (10) to be capable of being taken in and out from an inside and an outside of the cab (10).

29 Claims, 11 Drawing Sheets

F I G. 7
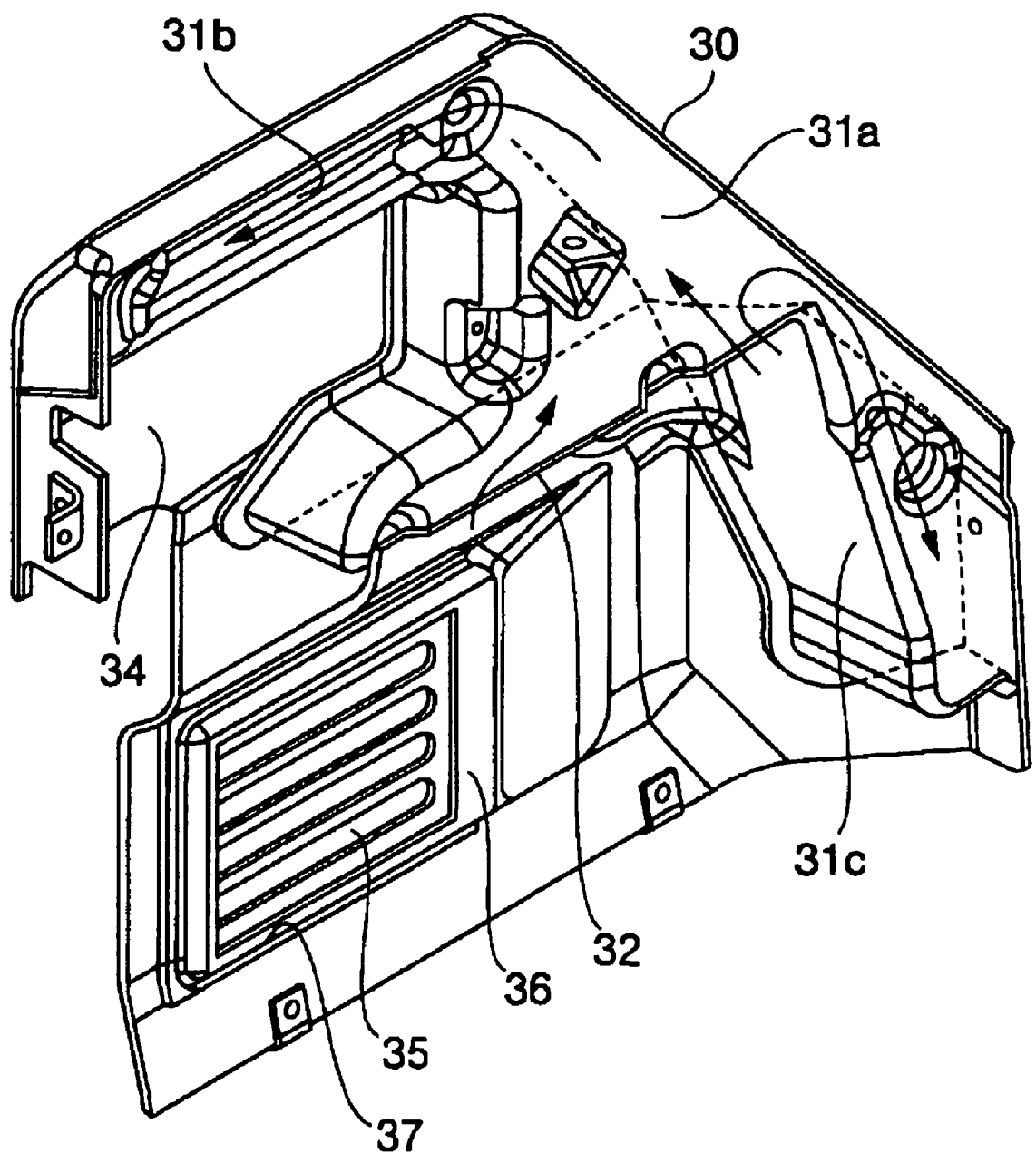

F I G. 10
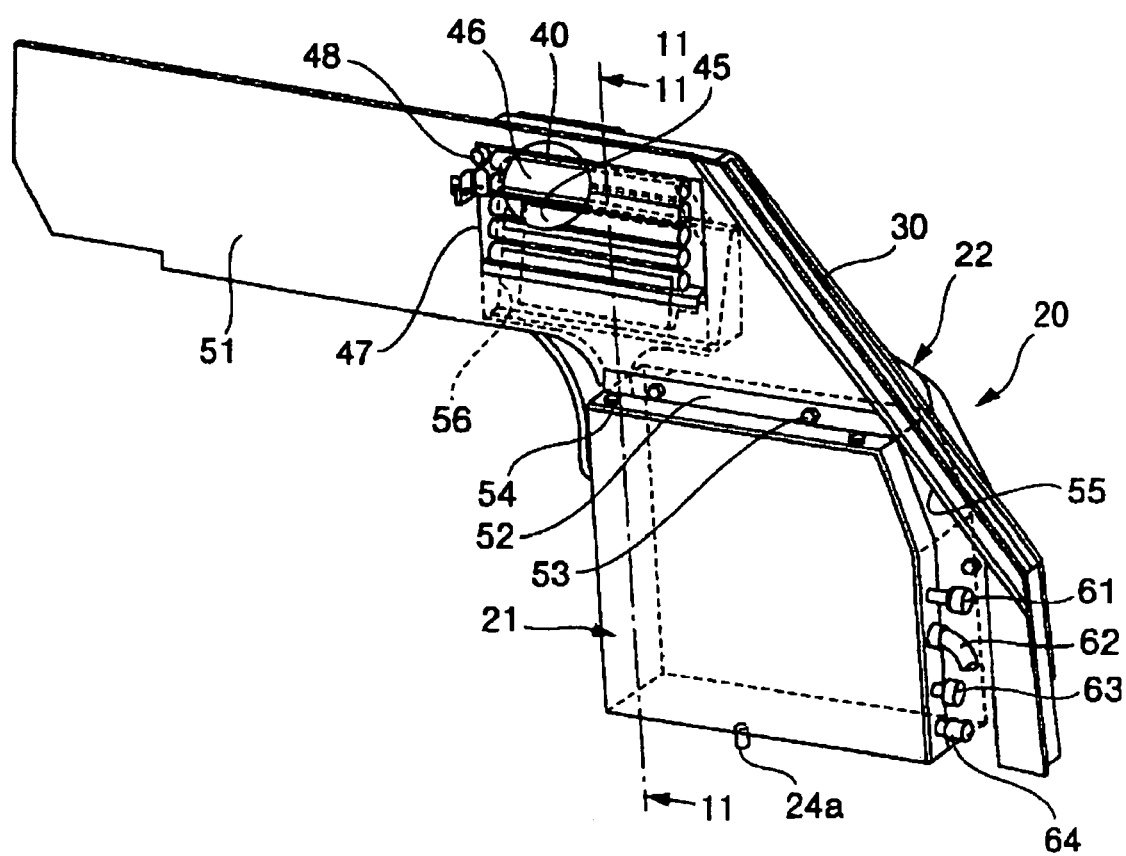

AIR CONDITIONING APPARATUS FOR HYDRAULIC SHOVEL

TECHNICAL FIELD

The present invention relates to an air conditioning apparatus which is installed in a cab of a hydraulic shovel.

BACKGROUND ART

There is a kind of construction equipment such as a hydraulic shovel including a cab which is made by enclosing an area around a cab scat by a door for getting on and off and wall surfaces having windows, and is provided with a working machine operating device and a traveling control device therein. Many units of equipment, in which air conditioning apparatuses are placed in the cabs for the purpose of improving operability (defroster for window glasses, and the like) and improving habitability (cooling and heating, air conditioning), are used in recent years. Conventionally, an air conditioning apparatus is placed, for example, between an operator seat and a rear wall surface of a cab (for example, see page 3 and FIG. 1 of Japanese Patent Laid-open No. 8-183323), on a rear wall portion of a cab or a floor surface under the operator seat (for example, see page 4, FIG. 2 and FIG. 4 of Japanese Patent Laid-open No. 2001-55760), a sealing surface of a cab (for example, see pages 3 to 5, and FIGS. 1 to 4 of Japanese Utility Model Laid-open No. 53-52549), or the like.

However, the above-described conventional air conditioning apparatus has the following problems. It is necessary to place a wind distribution duct for connecting the air conditioning apparatus and a blow port at each spot in order to guide air blown out of the air conditioning apparatus to blowout ports near a foot portion and a face portion of the operator, blow ports or a blow port for defrosting in the vicinity of windows or a windows on a front surface and/or a side surface. However, when the wind distribution duct is placed inside the cab, there arises the problem that a space inside the cab becomes narrow by the amount of the duct space. Further, there arises the problem that the ducts for connecting the air conditioning apparatus and specific blow ports become long. Namely, in the example described in Japanese Patent Laid-open No. 8-183323, the ducts, which are placed from the air conditioning apparatus at the rear portion in the cab to an area in the vicinity of the face portion of the operator, and an area in the vicinity of window glasses at the front surface and the side surface, become large. In the example described in Japanese Patent Laid-open No. 2001-55760, the lengths of the ducts respectively placed become long from the air conditioning apparatus under the operator seat to an area in the vicinity of the face portion of the operator, and areas in the vicinity of the window glasses on the front surface and the side surface. In the example described in Japanese Utility Model Laid-open No. 53-52549, the duct from the air conditioning apparatus on the ceiling surface of the cab to the foot portion becomes long. Consequently, it takes time to perform a placement operation of these ducts, and this becomes the factor to increase the manufacturing cost.

SUMMARY OF THE INVENTION

The present invention is made in view of the above-described problems, and has its object to provide an air conditioning apparatus for a hydraulic shovel with which a wide space in a cab can be secured, and a placement operation of ducts for distributing wind to each important point in the cab is facilitated.

In order to attain the above-described object, a first constitution of the air conditioning apparatus for the hydraulic shovel according to the present invention is such that in an air conditioning apparatus, which is placed in a cab of a hydraulic shovel, an air-conditioning unit is placed at a front portion of a right side in the cab.

According to the above constitution, the air conditioning apparatus is placed at the front portion of the right side in the cab, which is the position near both the face portion and the foot portion of the operator and the window glasses at the front surface and the side surface. As a result, distribution of wind to the operator and the window glasses can be extremely facilitated without placing a long duct or the like. Accordingly, time taken for the duct placing operation is made short, the manufacturing cost can be reduced and the duct space is reduced, thus making it possible to secure the wide space in the cab.

A second constitution of the air conditioning apparatus for the hydraulic shovel according to the present invention is such that in an air conditioning apparatus placed in a cab of the hydraulic shovel, an air-conditioning unit is mounted to a front portion of a right side wall surface of the cab. According to this constitution, the same operational effects as in the above-described first constitution can be also obtained.

In the air conditioning apparatus, the air-conditioning unit may constitute a part of the right side wall surface. According to this constitution, the protruded amount of the air-conditioning unit into the cab is reduced, and the wide space in the cab can be secured. In addition, the structure can be simplified.

In the air conditioning apparatus, the air-conditioning unit may be mounted to the right side wall surface to be capable of being taken in and out from an inside and an outside of the cab. According to this constitution, at the time of assembly of the vehicle with the cab being a separate body, the air-conditioning unit can be mounted to the right side wall surface from outside, and at the time of maintenance and the like after the cab is loaded on the vehicle, it can be taken out from the inside of the cab and installed. As a result, operability at the time of assembly and at the time of maintenance can be enhanced.

In the air conditioning apparatus, pipe connecting portions of the air-conditioning unit may be provided at a region exposed to an outside of the cab. According to this constitution, the pipes of hot water and the refrigerant gas to the air-conditioning unit can be connected to the pipe connecting portions provided at the region exposed to the outside of the cab. Consequently, the holes for passing the pipes and the connecting portions are not required on the side wall surface and the floor surface of the cab, the pipe sealing spots are reduced to make sealing easy, the spots causing gas leakage and water leakage are reduced, thus making it possible to enhance reliability. Since piping can be installed directly between the air-conditioning unit, and the radiator, gas compressor and the like substantially linearly, the piping route can be shortened, and the piping operation is facilitated.

In the air conditioning apparatus, the air-conditioning unit may have an inclined shape in which an upper portion at a front side of a vehicle is inclined downward to a front. The air conditioning apparatus may comprise the air-conditioning unit and an air-conditioning cover, and the air-conditioning cover may have an inclined shape in which an upper portion at a front side of a vehicle is inclined downward to a front. According to these constitutions, the air conditioning apparatus has the inclined shape in which the upper portion at the front side of the vehicle is inclined downward to the front, when the air-conditioning unit is exposed, or when the it is covered with the air-conditioning cover, and therefore the view in the direction of the right side of the front portion of the vehicle from the operator is not hindered by the air conditioning apparatus, thus making it possible to secure the field of view in the front on the right of the operator sufficiently. The air conditioning apparatus can be placed at the position of the front portion of the right side of the cab where the air conditioning apparatus is not conventionally placed for fear of reduction in the visibility in the front on the right, and the aforementioned excellent operational effects can be obtained.

In the air conditioning apparatus, an internal cover, which is put on the air-conditioning unit, may be provided with ducts for distributing air blown from the air-conditioning unit. According to this constitution, the internal cover has the ducts, and therefore it is not necessary to mount a new duct, and a duct placement space is saved to make it possible to secure the wide space in the cab. In addition, the air-conditioning unit and the duct can be hidden by this cover, and therefore the appearance can be enhanced.

In the air conditioning apparatus: a vent hole through which outside air is introduced into the air-conditioning unit may be provided at an upper region from an external cover for covering tanks including at least a working fluid tank, on a right side wall surface.

According to the above constitution, the vicinity of the vent hole provided at the upper region from the external cover, on the right side wall surface of the cab is located at the position substantially center of the vehicle, and therefore the air introduced from this vent hole has less inclusion of dust, and is less influenced by the rise in the temperature by warmed air after cooling the engine, and therefore preferable air for air conditioning can be introduced. As a result, the life of the outside air filter can be increased, and the air conditioning efficiency and the like can be enhanced.

BRIEF DESCRIPTION OF THE DRAWINGS

FIG. 7 is a perspective view of the inside air cover seen from an outside of the cab, according to the embodiment;

FIG. 10 is a perspective view of the air conditioning apparatus according to the embodiment seen from the outside of the cab.

BEST MODE FOR CARRYING OUT THE INVENTION

A preferred embodiment of the present invention will be explained in detail hereinafter with reference to the drawings. First, a general constitution of a rear ultrasmall revolving type hydraulic shovel, which is an example of a machine to which the present invention is applied, will be explained according to FIGS. 1 to 3.

Figure 1:
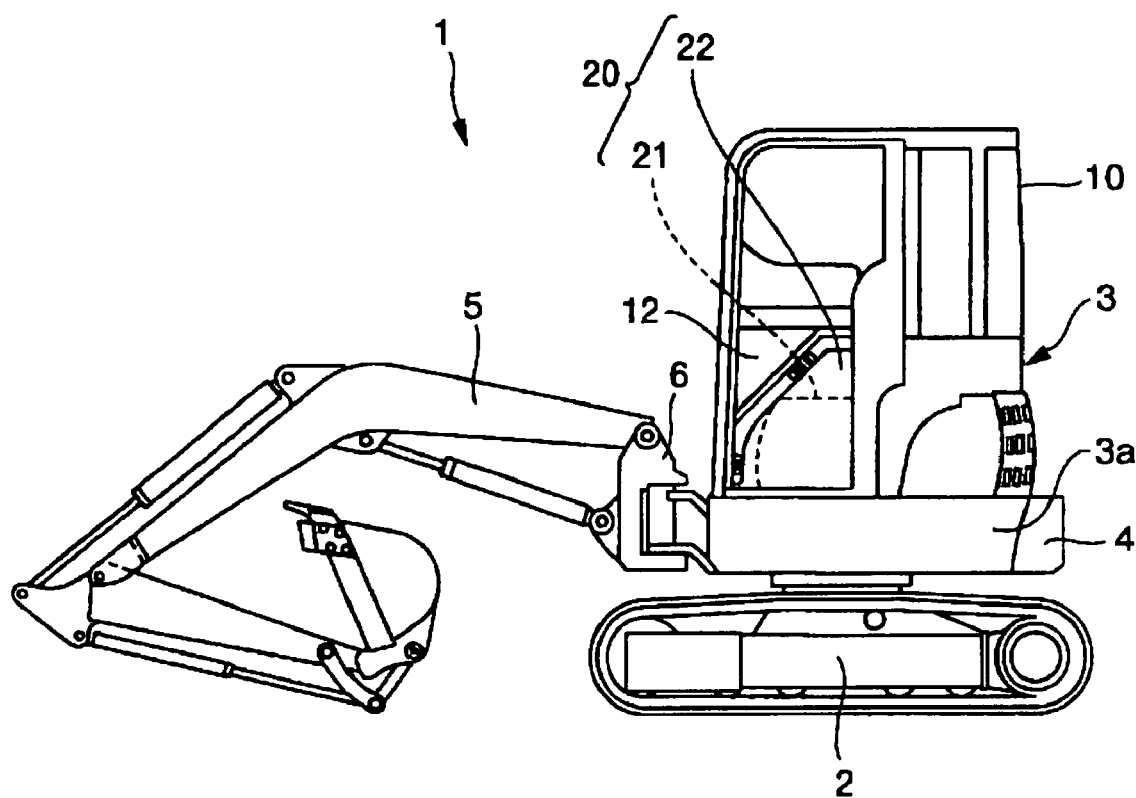
FIG. 1 is a side view of a hydraulic shovel being an example of a machine to which the present invention is applied.
Figure 2:
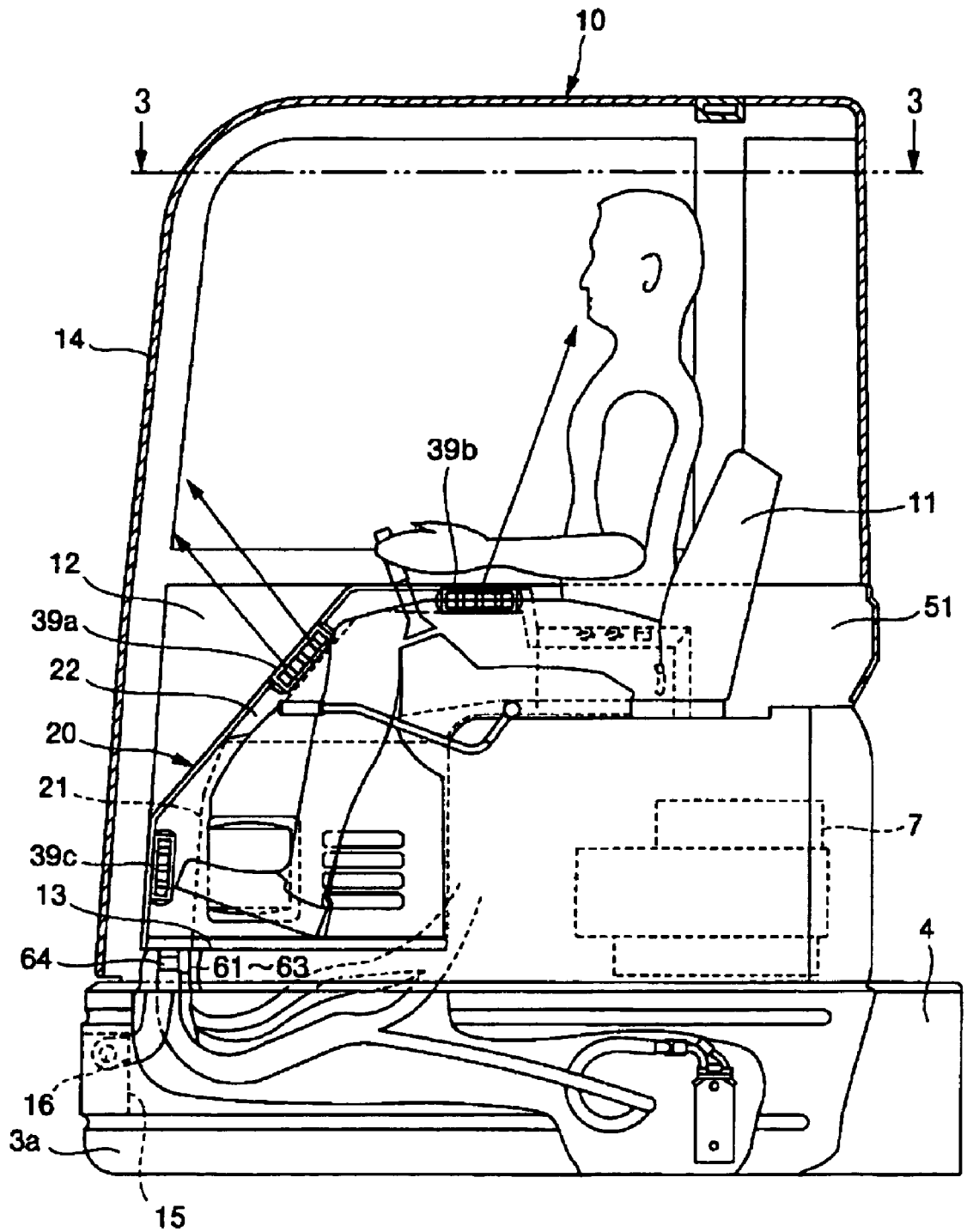
FIG. 2 is a side partial sectional view of an upper revolving superstructure of the hydraulic shovel in FIG. 1.
Figure 3:
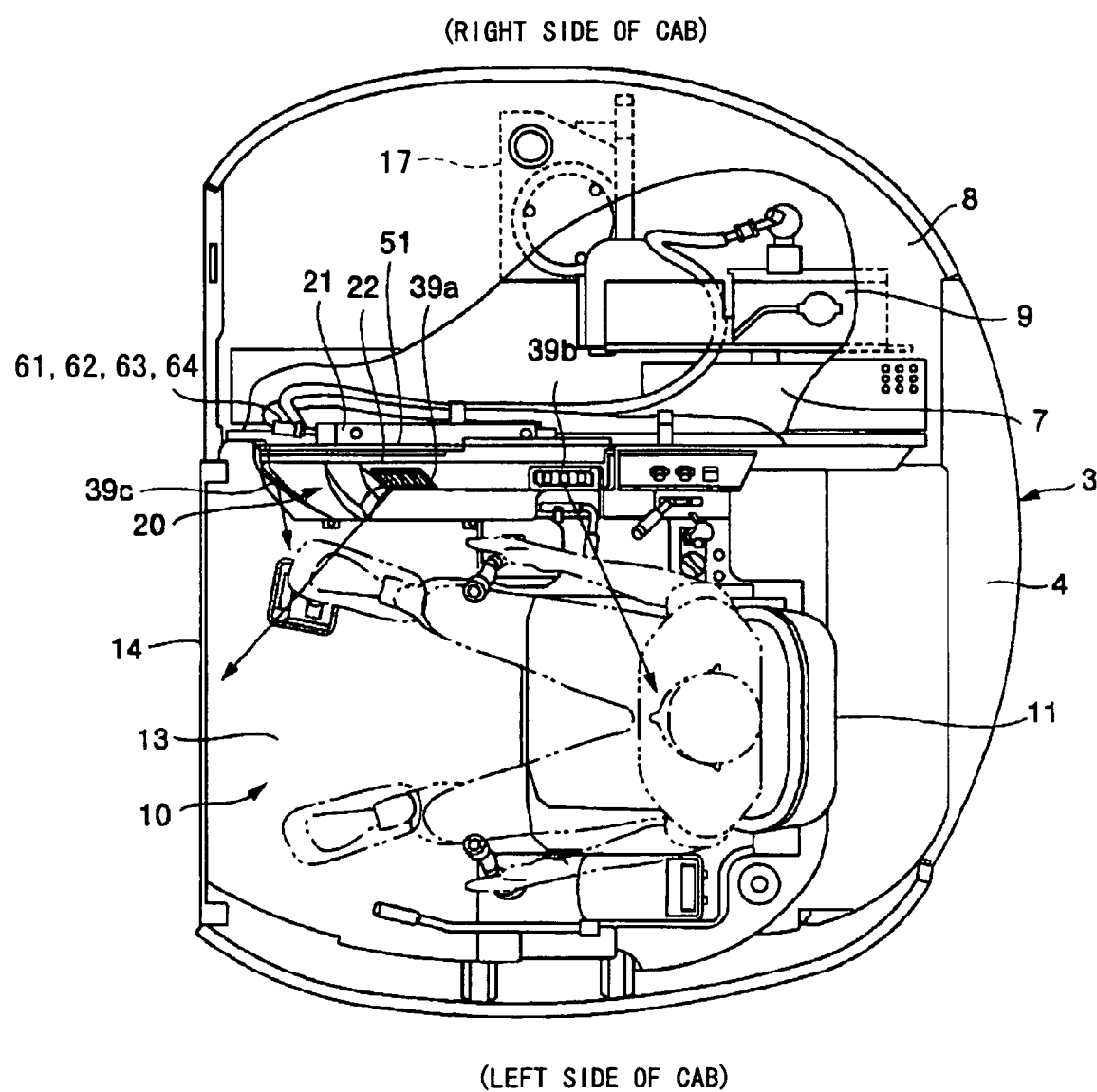
FIG. 3 is a sectional view taken along the line 3—3 in FIG. 2.

In FIGS. 1 to 3, a hydraulic shovel 1 is loaded with an upper revolving superstructure 3 rotatably on a base carrier 2, and is provided with a cab 10 from a central portion of a front portion to a left end portion of a revolving frame 3a included at a lower portion of the upper revolving superstructure 3, and a counterweight 4 is mounted on a rear end portion of the revolving frame 3a. The cab 10 is connected to a bracket 15 provided at a front end portion of the revolving frame 3a to be swingable in a longitudinal direction via a horizontal pin 16, and is tiltable at a predetermined angle around the horizontal pin 16. An engine 7 is provided under an operator seat 11 provided a little rearward from a central portion of the cab 10 and in front of the counterweight 4. A working fluid tank 17 and a fuel tank (not shown) are placed at a right side of the cab 10 and on a right portion of the revolving frame 3a, and the tank 17 and the like are covered with an external cover 8. A swing bracket 6 is mounted to a front end portion of the revolving frame 3a to be capable of swinging laterally (hereinafter, called swing). A working machine 5 having a boom, an arm, a bucket and the like is mounted to the swing bracket 6 to be swingalbe within a vertical plane. The hydraulic shovel 1 is a rear ultrasmall revolving type in which "a revolving locus of a rear end portion of the upper revolving superstructure 3 is within a lateral crawler belt width of the base carrier 2".

An air conditioning apparatus 20 is provided at a front portion of a right side wall surface of the cab 10. Here, "the right side of the cab 10" means the right side, facing to a traveling direction of the hydraulic shovel 1 as shown in FIG. 3. "The front portion of the cab 10" means the portion at the front side in the traveling direction of the hydraulic shovel 1. The air conditioning apparatus 20 includes an air-conditioning unit 21 having functions of cooling, heating and the like, and an air-conditioning cover 22. The air-conditioning cover 22 serves both as a cover having an interior function for covering the air-conditioning unit 21 from an inside of the cab 10, and as an air-conditioning duct for distributing air blown by the air-conditioning unit 21 in a predetermined direction. The air-conditioning unit 21 is provided so as to form a part of the right side wall surface of the cab 10, namely, to be fitted into an opening formed to penetrate through a right side wall plate 51. A part of an outer side of the air-conditioning unit 21 protrudes outward from the right side wall plate 51, and pipe connecting portions of the air-conditioning unit 21 are provided at the region, which is outside the cab 10. The air-conditioning unit 21, or the air-conditioning cover 22 including the air-conditioning unit forms a shape in which an upper portion at a front side of a vehicle (an upper portion of the right side seen from the inside of the cab 10) in the side view is inclined downward to the front of the vehicle. A substantially triangular window glass 12 is fitted into an upper portion of the wall surface of the cab 10 from the inclined portion. It should be noted that "the vehicle" means the hydraulic shovel.

Figure 4:
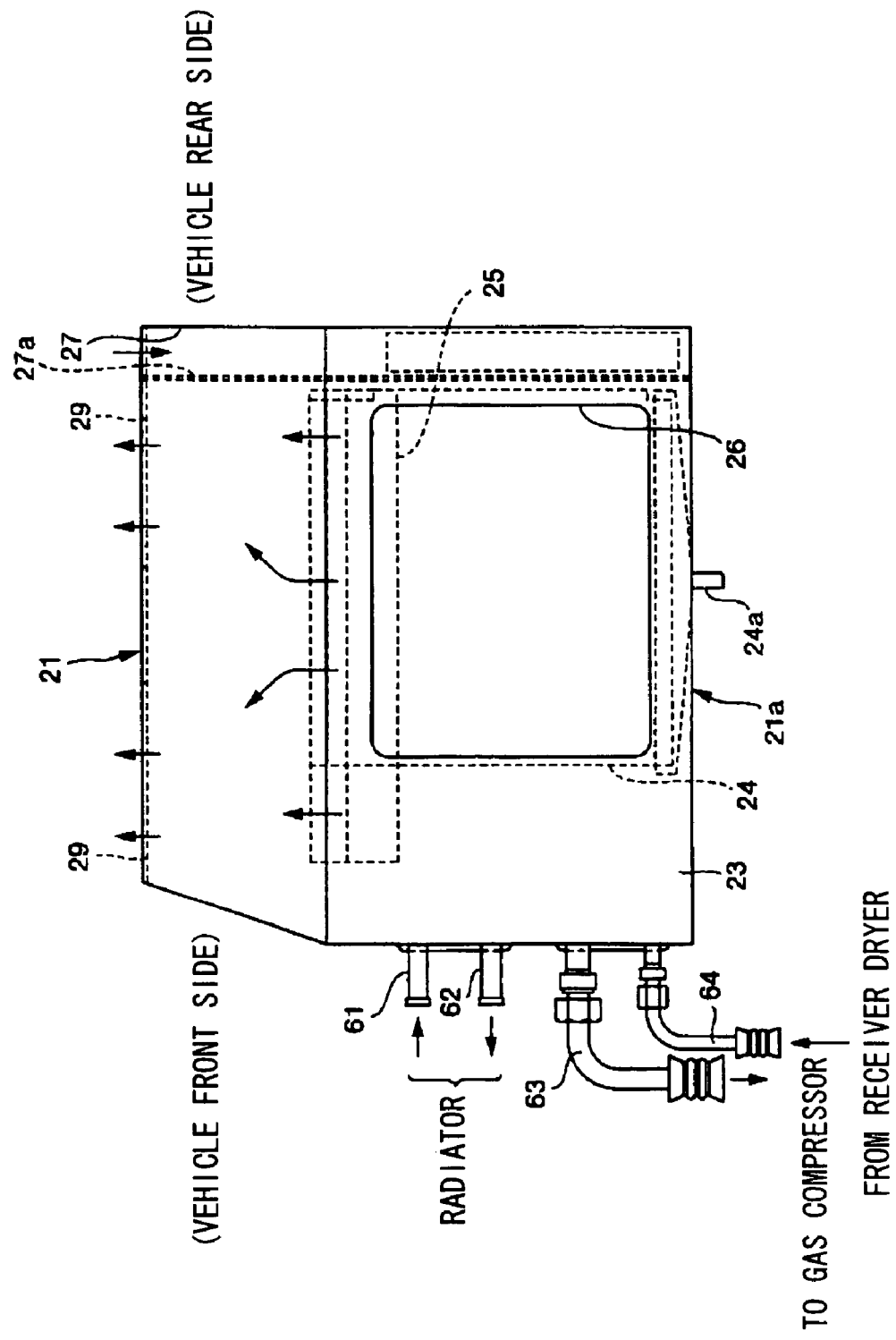
FIG. 4 is a side view of an air-conditioning unit according to an embodiment of the present invention.

Next, a constitution of the air-conditioning unit 21 will be explained based on FIG. 4. In the air-conditioning unit 21, a heat exchange chamber 23 at a front side of the vehicle, and an outside air introduction chamber 27 at a rear side by a partition plate 27a provided at a rear portion side (right side in FIG. 4) inside a case 21a. The heat exchange chamber 23 and the outside air introduction chamber 27 communicate with each other via a through hole (not shown) provided at a lower portion of the partition plate 27a. The heat exchange chamber 23 includes therein an evaporator 24 having a cooling and dehumidifying function, and a heater core 25 having a heating function, and includes a tray having a drain pipe 24a at a bottom portion thereof. Hot water pipes 61 and 62 for supplying and discharging hot water to and from the heater core 25, and refrigerant gas pipes 63 and 64 for supplying and discharging a cooling medium gas to and from the evaporator 24 are provided at the region of a side surface of the heat exchange chamber 23, which is at the front side of the vehicle, and outside the cab 10, which lies outward from the right side wall plate 51. A hot water pipe branching from a radiator 9 (see FIG. 3) in the vicinity of the engine 7 is connected to the hot water pipes 61 and 62, and refrigerant gas pipes from a gas compressor and a receiver dryer (both not shown) are connected to the refrigerant gas pipes 63 and 64, respectively. An inside air introduction hole 26 is formed in a side surface of the heat exchange chamber 23 inside the cab. An outer periphery portion of the evaporator 24 is sealed with a packing of rubber or the like so that most of the air introduced from the inside air introduction hole 26 passes through a heat exchange portion of the evaporator 24.

In the heat exchange chamber 23, an air blower (not shown) is provided at an upper portion, and blast ports 29 and 29 are formed in a top surface. An inside and outside air change-over valve (not shown) is provided in the vicinity of an inlet port of the outside air introduction chamber 27. The inside and outside air change-over valve is switchable by an inside and outside air change-over switch 74 provided at an air conditioning operating section 70 placed beside the air conditioning apparatus 20. The air-conditioning unit 21 introduces inside air or outside air into it, and blows the air which is air-conditioned by the evaporator 24 and the heater core 25 upward from the blast ports 29 and 29.

Figure 5:
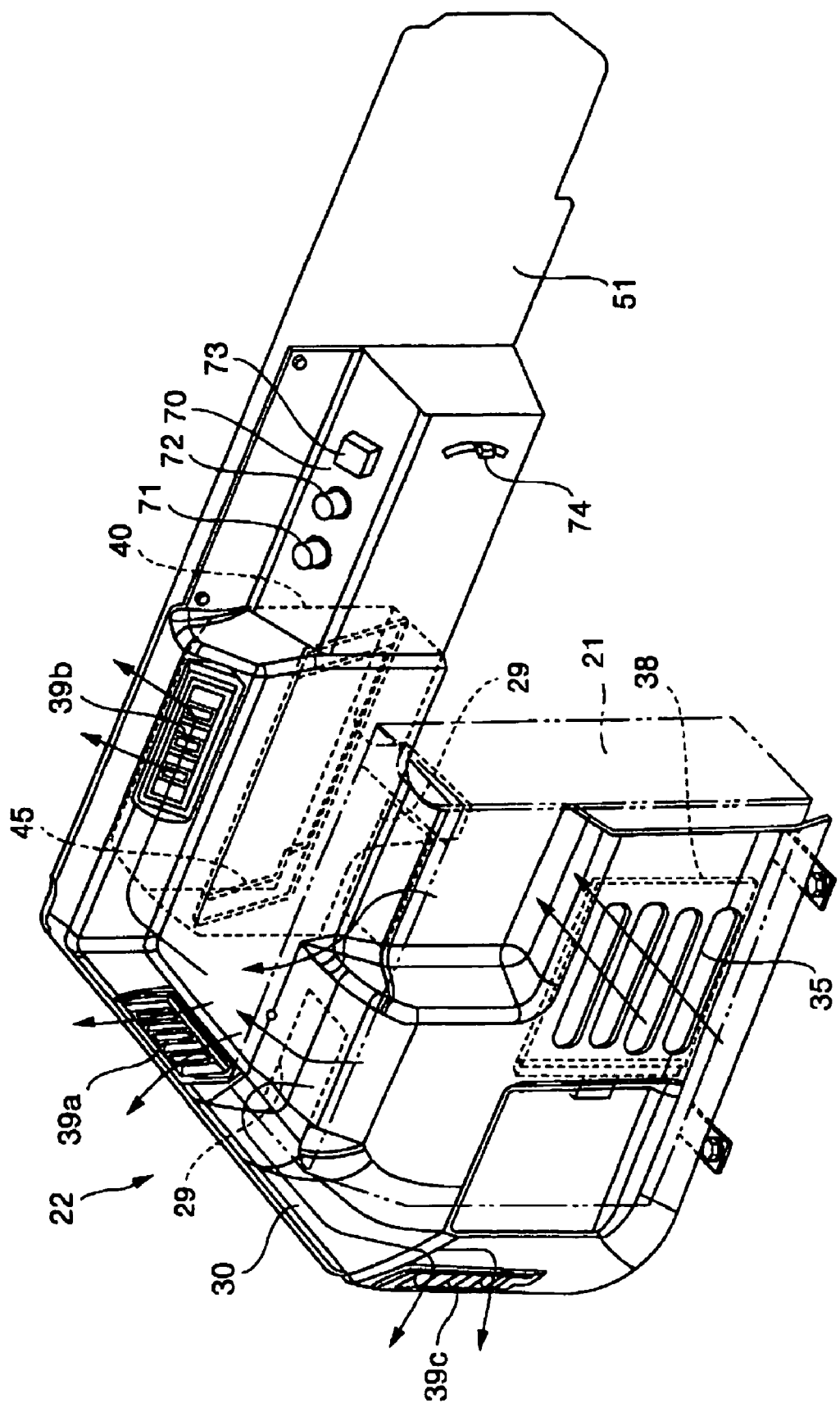
FIG. 5 is a perspective view of an air-conditioning cover and an air-conditioning operating portion according to the embodiment.

Next, the air-conditioning cover 22 will be explained in detail according to FIG. 5 to FIG. 9. As shown in FIG. 5, the air-conditioning cover 22 includes an inside air cover 30 for covering the air-conditioning unit 21 from the inside of the cab 10, and an outside air duct 40 which is attached to a back surface of the inside air cover 30 and introduces the outside air into it. The inside air cover 30 and the outside air duct 40 are produced by vacuum molding or press molding of a synthetic resin. The air conditioning operating section 70 for operating an operation of the air-conditioning unit 21 is mounted to a right side portion of the air-conditioning cover 22 on the right side wall plate 51. The air conditioning operating portion 70 is provided with a power supply switch 73, a temperature adjusting portion 71, an air flow adjusting portion 72, and the inside and outside air change-over switch 74.

Figure 6:
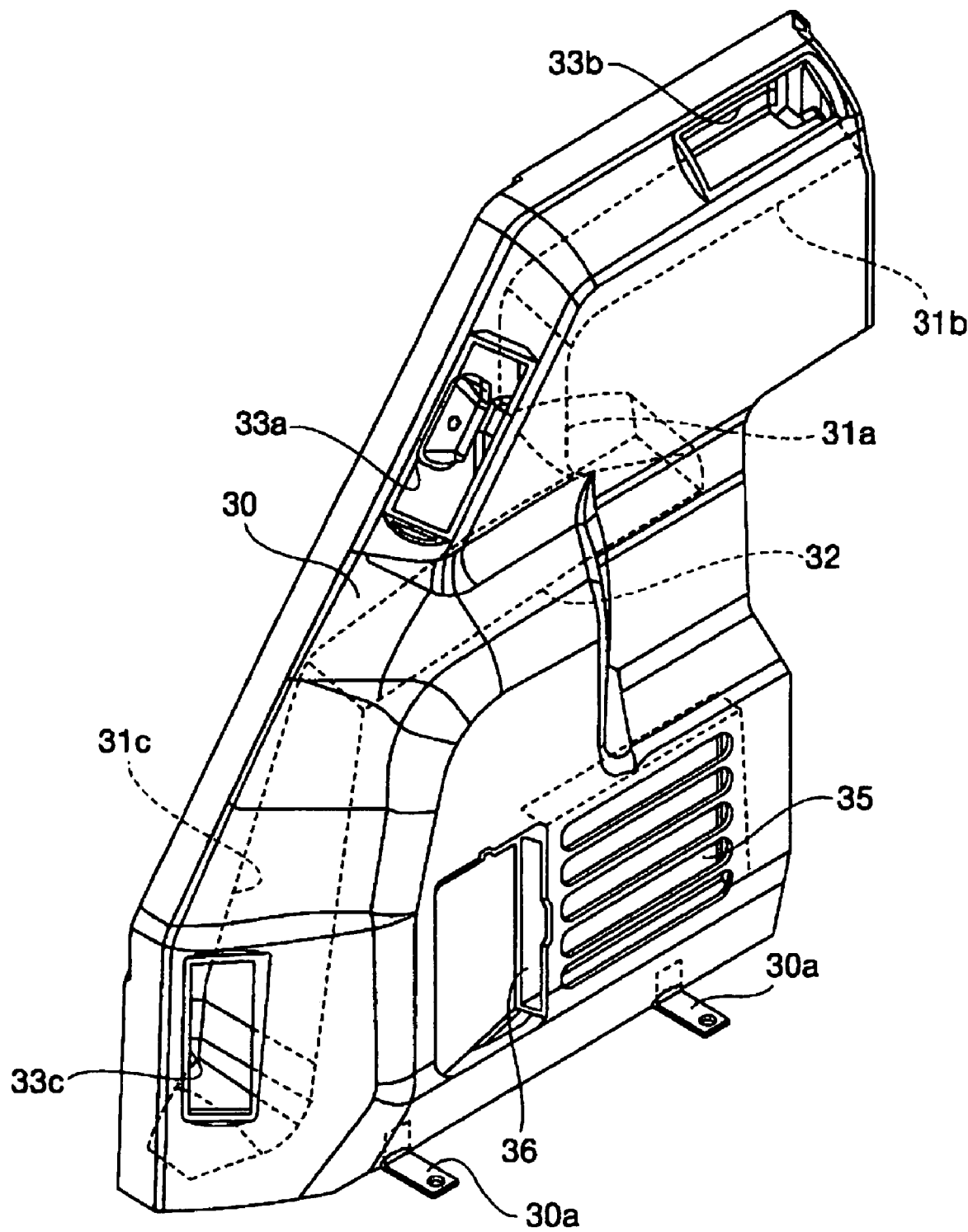
FIG. 6 is a perspective view of an inside air cover seen from an inside of a cab, according to the embodiment.

In FIG. 6 and FIG. 7, hollow ducts are integrally formed in a back surface portion of the inside air cover 30. A middle duct 31a is formed at a position facing the blast ports 29 and 29 on the top surface of the air-conditioning unit 21, an upper duct 31b is formed to be substantially horizontal at an upper periphery portion of the inside air cover 30 to communicate with the middle duct 31a, and a lower duct 31c is formed in an outer periphery portion of a lower portion of the inside air cover 30 to communicate with the middle duct 31a. An introduction port 32 for introducing air-conditioned air is provided in the middle duct 31a at the position facing the blast ports 29 and 29 of the air-conditioning unit 21.

A middle, an upper and a lower blow ports 33a, 33b and 33c are formed in the middle duct 31a, the upper duct 31b and the lower duct 31c, respectively, to communicate with an inside of the cab 10. Blow members 39a, 39b and 39c (see FIG. 5) capable of adjusting the wind direction are respectively inserted into the blow ports 33a, 33b and 33c. An outside air duct placement portion 34 is formed in a recessed shape at a region surrounded by the middle duct 31a and the upper duct 31b.

A lower portion of the inside air cover 30 is formed into a protruding shape to the inside of the cab, and an inside air introduction hole (constituted of slits in this embodiment) 35 is formed in the protruding portion thereof. A vertically long filter exchange hole 36, which is a little longer than the length in the up and down direction of the inside air introduction hole 35, is formed at a region located at a side surface of the aforesaid protruding portion. Filter guide grooves 37 and 37 are formed at an upper and lower portion of a back surface of the inside air introduction hole 35. An inside air filter 38 is inserted from the filter exchange hole 36 and guided by the filter guide grooves 37 and 37 to be attached to a back surface side of the inside air introduction hole 35. A mounting bracket 30a is attached to a lower end portion of the inside air cover 30. The inside air cover 30 is mounted to a floor plate 13 of the cab 10 via the mounting bracket 30a.

Next, the outside air duct 40 will be explained in detail according to FIG. 8 and FIG. 9. The outside air duct 40 has a box-shaped filter chamber portion 41, and a duct portion 42 communicating with the filter chamber portion 41. The filter chamber portion 41 has an outside air introduction port 46 opened to an outside of the cab 10, and forms filter abutment portions 43 and filter locking portions 44 inside a left and a right side surface portions. An outside air filter 45 (see FIG. 10 and FIG. 11) is inserted from the outside air introduction port 46, and abuts to the abutment portion 43 to be positioned. Locking portions (not shown) provided at a left and a right end portions of the outside air filter 45 are locked by the filter locking portions 44. Mounting brackets 49a and 49b are provided at a left and a right outer surface portions of the filter chamber portion 41.

Figure 8:
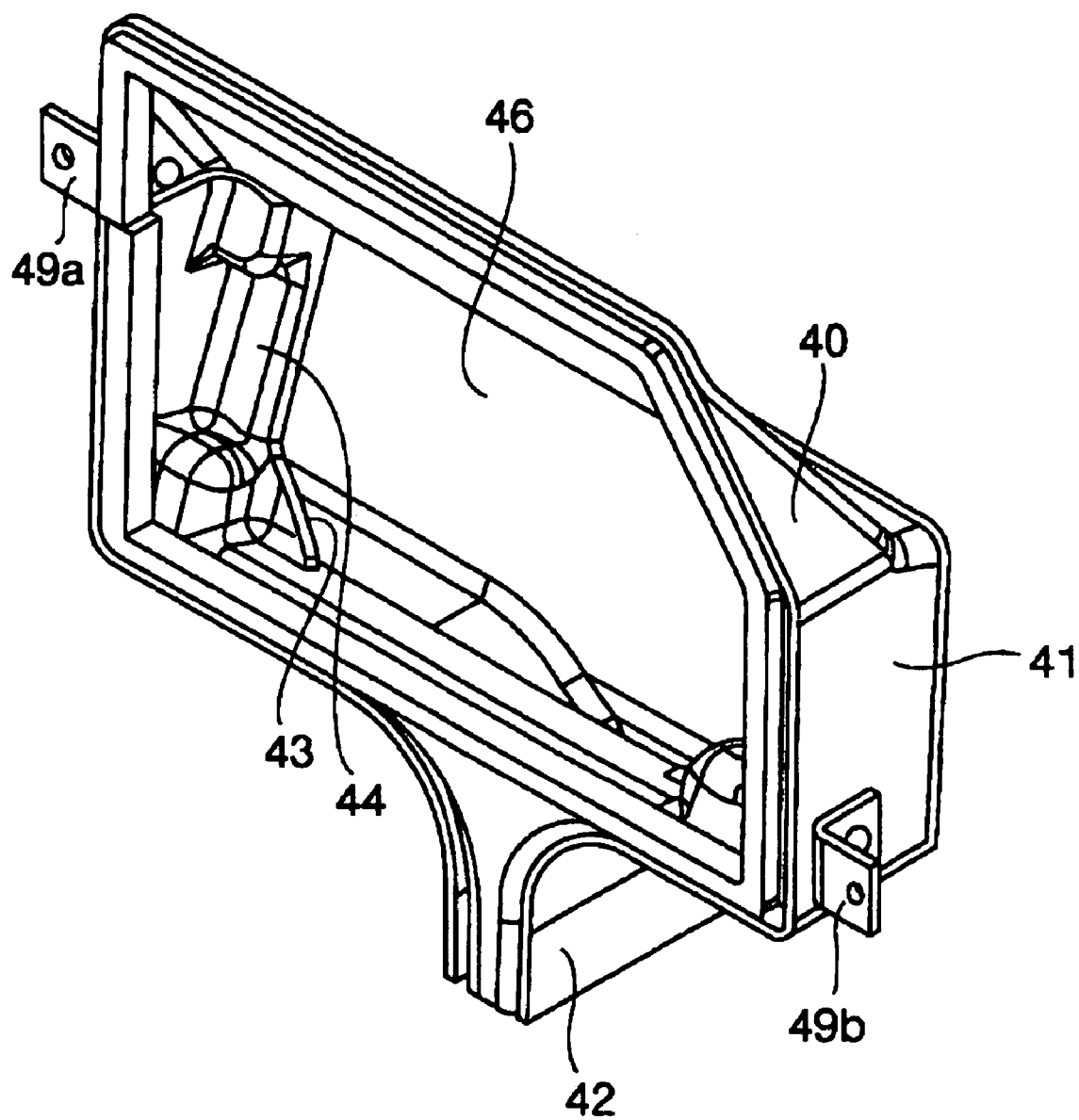
FIG. 8 is a perspective view of an outside air duct seen from the outside of the cab, according to the embodiment.
Figure 9:
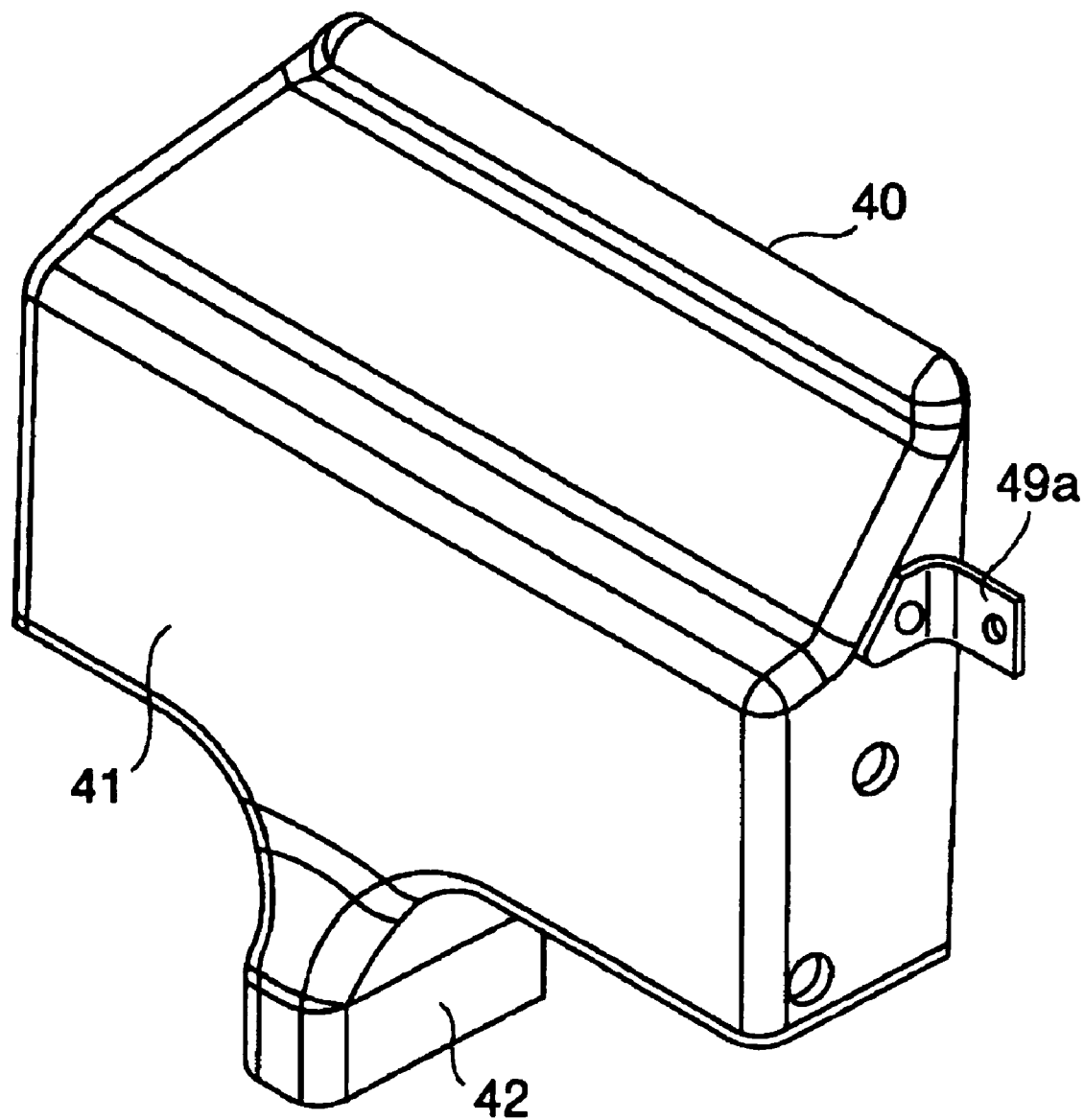
FIG. 9 is a perspective view of an outside air duct seen from the inside of the cab, according to the embodiment.

As shown in FIG. 5, FIG. 6 and FIG. 8, the outside air duct 40 is fitted into the outside air duct placement portion 34 of the inside air cover 30 with the outside air introduction port 46 facing to an outside of the cab 10, and the mounting brackets 49a and 49b are mounted to the right side wall plate 51. Then, the inside air cover 30 is put thereon from the front of the air-conditioning unit 21, and is mounted to the floor plate 13 and the right side wall plate 51 of the cab 10. The outside air duct 40 and the inside air cover 30 may be constituted to be previously integrated and put on the air-conditioning unit 21 from the front thereof.

Figure 11:
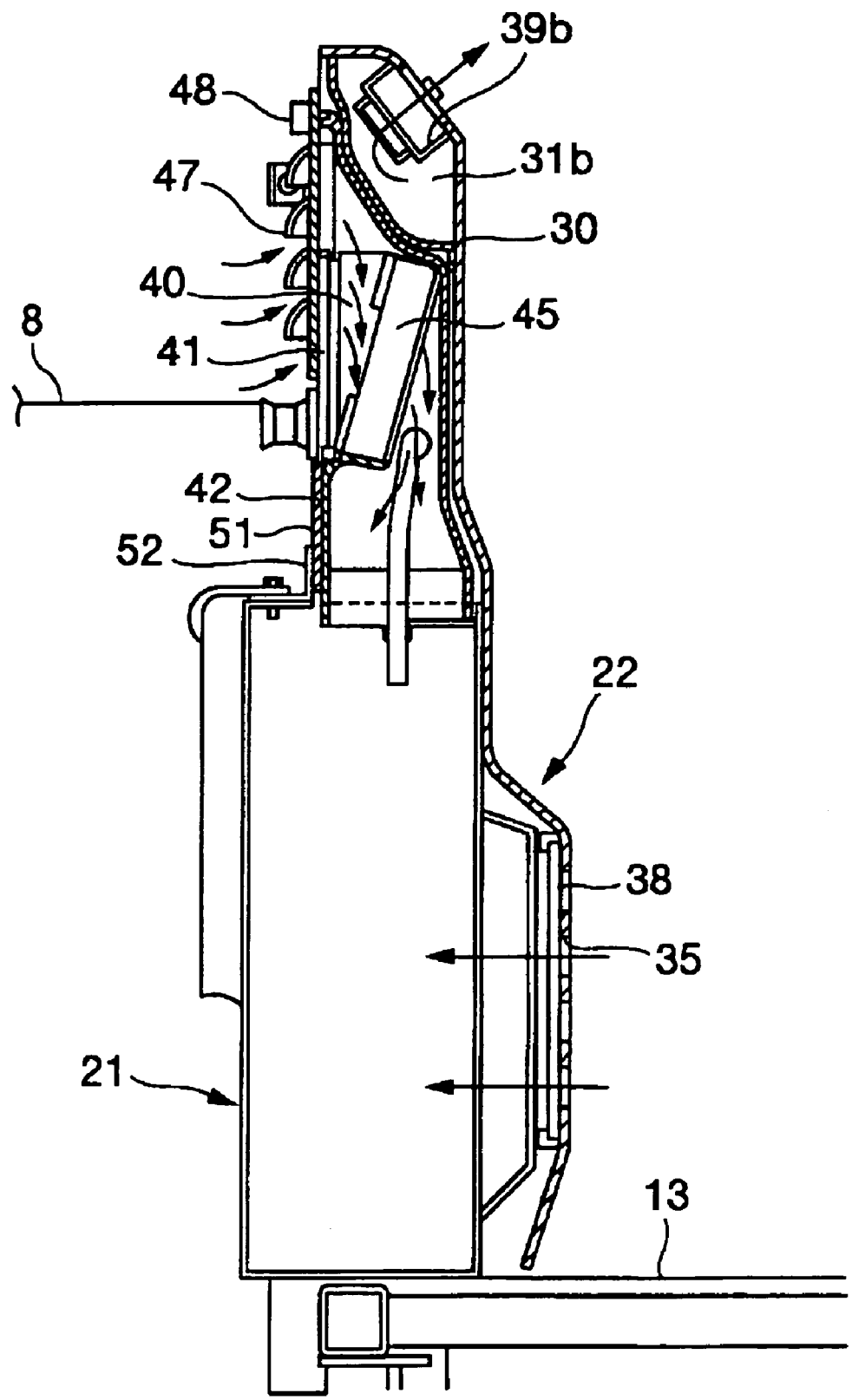
FIG. 11 is a sectional view taken along the line 11—11 in FIG. 10.

In FIG. 10 and FIG. 11, a mounting hole 55 and a vent hole 56 are respectively formed in a region opposing to the air-conditioning unit 21 and a region opposing to the outside air introduction port 46 of the outside air duct 40, of the right side wall plate 51. The air-conditioning unit 21 is inserted into the mounting hole 55, and mounted to the right side wall plate 51 from outside via a bracket 52 in a L-shaped section with bolts 53 and 54 with part of the outside of the case 21a (FIG. 4) being protruded outward from the right side wall plate 51. The mounting hole 55 has the size which makes it possible to draw the air-conditioning unit 21 and the pipe connecting portions on its side surface into the inside of the cab when the bracket 52 is removed from the outside of the cab 10 at the time of maintenance.

An air intake cover 47 having louvers is mounted to the right side wall plate 51 with a bolt 48 to cover the vent hole 56 from outside. The vent hole 56 is formed to be located at an upper position from the external cover 8 for covering the working fluid tank 17, the fuel tank and the like provided at the right side of the cab 10. When the air intake cover 47 is removed, the outside air filter 45 of the outside air duct 40 is detachable and attachable from the outside air introduction port 46.

Next, an intake and a blowout routes of air by the air conditioning apparatus 20 will be explained with reference to FIGS. 4, 5, 7 and 11. Inside air is introduced into a heat exchange chamber 23 of the air-conditioning unit 21 via the inside air introduction hole 35 and the inside air filter 38 of the inside air cover 30 as shown in FIG. 5. Outside air is introduced into the outside air introduction chamber 27 and the heat exchange chamber 23 of the air-conditioning unit 21 via the louvers of the air intake cover 47, the outside air filter 45 of the outside air duct 40, and the duct portion 42 as shown in FIG. 11. The air which is air-conditioned in the heat exchange chamber 23 is blown from the blast ports 29 and 29, as shown in FIG. 4. Further, as shown in FIG. 5 and FIG. 7, the air is sent to the middle duct 31a, the upper duct 31b and the lower duct 31c, respectively, via the introduction port 32 of the inside air cover 30, and blown into the cab 10 from the blow members 39a, 39b and 39c.

As shown in FIGS. 2 and 3, the air blown out of the blow member 39a is blown toward the front glass 14 of the cab 10, the air blown out of the blow member 39b is blown toward the face portion of the operator, and the air blown out of the blow member 39c is blown toward the foot portion of the operator. The operator manually adjusts the wind directions of the blow members 39a, 39b and 39c in accordance with the posture at the time of operation.

In the above-described embodiment, the explanation is made with the constitution example in which the air-conditioning unit is mounted to the front portion of the right side wall surface of the cab, but the air-conditioning unit may be placed at the front portion of the right side of the floor surface. In this case, the upper portion of the air conditioning apparatus (including the air-conditioning unit and the air-conditioning cover) at the front side of the vehicle is constituted to be formed into the shape cut by the inclined place downward to the front to secure the visibility of in the front on the right. An opening is provided in the right side wall surface, and the above-described air-conditioning unit is placed on the floor surface to be fitted into this opening, whereby it is possible to take the air-conditioning unit in and out from the inside and the outside of the cab, and the pipe connecting portions can be provided at the region exposed to the outside of the cab. Further, the air-conditioning unit can sever as part of the right side wall surface, and therefore it is possible to secure the wide space inside the cab.

The constitution is such that the air blown from the air conditioning apparatus is blown to the front glass, but a blast port may be provided at the middle duct of the air-conditioning cover so that the air is blown to at least any one of the front glass and the side glass. The explanation is made with the rear ultrasmall revolving type hydraulic shovel as an example of the machine to which the present invention is applied, but the present invention is not limited to this, and is applicable to the other hydraulic shovels.

According to the above constitution, the present invention provides the following effects. Since the air-conditioning unit is placed on the wall surface or the floor surface of the front portion of the right side of the cab, the distances from this air-conditioning unit to the foot portion and the face portion of the operator, and the window glasses on the front surface and the side surface become short, and therefore wind distribution to them becomes very easy. The ducts for blowing the air to the foot portion and the face portion of the operator, and the window glasses on the front surface and the side surface can be made very short, and in the best case, even the ducts can be eliminated. Accordingly, the duct placement space is small, and therefore the larger dwelling space in the cab can be secured. As a result of this, the time taken for the placement operation of the ducts is made short, and the manufacturing cost can be reduced. In this situation, the air-conditioning unit is mounted to the front portion of the right side wall surface of the cab, whereby the protruding amount of the air-conditioning unit into the cab is extremely reduced, and therefore the wider dwelling space in the cab can be secured.

The air-conditioning unit is mounted so that it can be taken in and out from the inside and the outside of the cab. In the above-described embodiment, the air-conditioning unit is fitted into the opening of the right side wall surface from the inside or the outside, and this air-conditioning unit is mounted to the right side wall surface with the bracket with the L-shaped section, therefore making it possible to take the air-conditioning unit out from the inside or the outside of the cab by removing the bracket when removing the air-conditioning unit. Consequently, at the time of assembling the vehicle, the air-conditioning unit can be mounted by being fitted into the opening of the aforesaid right side wall surface from the outside. It is difficult to take the air-conditioning unit in and out from the outside at the time of maintenance after the assembly, but it can be taken in and out from the inside, whereby assembling easiness and maintainability are increased.

Since the air-conditioning unit is mounted by being fitted into the opening to also serve as a part of the right side wall surface, the protruding amount of the air-conditioning unit into the cab can be reduced. As a result, the wide space in the cab can be secured, and the structure which makes it possible to take the air-conditioning unit in and out from the inside and the outside can be realized with a simple constitution.

Since the pipe connecting portions are provided at the region of the air-conditioning unit exposed to the outside of the cab, holes for passing the pipes and connecting portions are not required on the floor surface or the wall surface, and the sealed spots are decreased to make sealing easy. In addition, the spots causing the gas leakage and water leakage are reduced, and reliability is enhanced. Since piping is directly installed between the air-conditioning unit, and the engine, the gas compressor and the like substantially linearly, the piping route can be shortened, and the piping operation is facilitated.

The air conditioning apparatus (including the air-conditioning unit and the air-conditioning cover) is provided at the front portion of the right side of the cab, and this air conditioning apparatus has the inclined shape in which the upper portion of the front side of the vehicle is inclined downward to the front. Consequently, the view in the direction of the right side of the front portion of the vehicle from the operator is not hindered by the air conditioning apparatus, and the view in the front on the right from the operator can be sufficiently secured. In the above-described embodiment, the shapes of the air-conditioning unit and the air-conditioning cover are both constituted as described above, but they are not limited to this, and, for example, only the air-conditioning cover, which is put on the air-conditioning unit, may be formed into the above-described shape, or only the air-conditioning unit may be formed into the above-described shape in the case in which the air-conditioning cover is not put thereon. Further, the air conditioning apparatus can be placed at the position at the right side of the front portion of the cab in which the air conditioning apparatus is not placed for fear of reduction in the visibility in the front on the right in the prior art, and the excellent effects described so far are obtained.

Since the air-conditioning cover (internal cover), which is put on the air-conditioning unit, has the ducts for distributing air blown from the air-conditioning unit, it is not necessary to mount a new duct, and the duct placement space is saved to make it possible to secure the wide space in the cab. In addition, this cover hides the air-conditioning unit and the ducts, and therefore the appearance can be enhanced. Since the air-conditioning cover also includes the outside air duct for taking in the outside air, it is not necessary to place a new duct, and therefore the large space in the cab can be secured.

The vent hole through which the outside air is introduced into the air-conditioning unit is provided at an upper region from the external cover, of the right side wall surface of the cab. Since the vicinity of this vent hole is located substantially in the center of the vehicle, the air introduced from the vent hole has less inclusion of dust, or is less influenced by the rise in temperature by the warmed air after cooling the engine, and therefore preferable air for air-conditioning can be introduced. As a result of this, the life of the outside air filter, the air-conditioning efficiency and the like can be enhanced. Further, since the distance from the air-conditioning unit and the vent hole through which the outside air is introduced into the air-conditioning unit is short, the outside air duct for taking in the outside air is made compact, and the air-conditioning cover mounted with the outside air duct can be constituted to be compact, thus making it possible to secure the wide space in the cab.

What is claimed is:

1. An air conditioning apparatus for a hydraulic shovel, which is placed in a cab of the hydraulic shovel, said apparatus comprising:
    an air-conditioning unit which cools air, which is placed as a whole at a front portion of a right side in said cab, and which is provided to be fitted into an opening that penetrates through a right side wall of said cab such that the air-conditioning unit constitutes a part of a surface of said right side wall.

2. The air conditioning apparatus for the hydraulic shovel according to claim 1, wherein said air-conditioning unit is mounted to said right side wall to be removable from both inside and outside of said cab.

3. The air conditioning apparatus for the hydraulic shovel according to claim 1, wherein said air-conditioning unit comprises pipe connecting portions provided at a region thereof exposed to outside of said cab.

4. The air conditioning apparatus for the hydraulic shovel according to claim 1, wherein said air-conditioning unit has an inclined shape such that an upper portion thereof at a front side of the hydraulic shovel is inclined downward toward the front side.

5. The air conditioning apparatus for the hydraulic shovel according to claim 1, further comprising:
    an air-conditioning cover;
    wherein said air-conditioning cover has an inclined shape such that an upper portion thereof at a front side of the hydraulic shovel is inclined downward toward the front side.

6. The air conditioning apparatus for the hydraulic shovel according to claim 1, further comprising an internal cover, which is put on said air-conditioning unit, and which comprises ducts for distributing the air blown from said air-conditioning unit.

7. The air conditioning apparatus for the hydraulic shovel according to claim 1, further comprising a vent hole through which outside air is introduced into said air-conditioning unit, and which is provided at an upper region of said right side wall above an external cover for covering tanks of the hydraulic shovel including at least a working fluid tank.

8. An air conditioning apparatus for a hydraulic shovel, which is placed in a cab of the hydraulic shovel, said apparatus comprising:
    an air-conditioning unit which is mounted to a front portion of a right side wall of said cab, and which is provided to be fitted into an opening that penetrates through a right side wall of said cab such that the air-conditioning unit constitutes a part of a surface of said right side wall.

9. The air conditioning apparatus for the hydraulic shovel according to claim 8, wherein said air-conditioning unit is mounted to said right side wall to be removable from both inside and outside of said cab.

10. The air conditioning apparatus for the hydraulic shovel according to claim 8, wherein said air-conditioning unit comprises pipe connecting portions provided at a region thereof exposed to outside of said cab.

11. The air conditioning apparatus for the hydraulic shovel according to claim 8, wherein said air-conditioning unit has an inclined shape such that an upper portion thereof at a front side of the hydraulic shovel is inclined downward toward the front side.

12. The air conditioning apparatus for the hydraulic shovel according to claim 8, further comprising:
    an air-conditioning cover;
    wherein said air-conditioning cover has an inclined shape such that an upper portion thereof at a front side of the hydraulic shovel is inclined downward toward the front side.

13. The air conditioning apparatus for the hydraulic shovel according to claim 8, further comprising an internal cover, which is put on said air-conditioning unit, and which comprises ducts for distributing the air blown from said air-conditioning unit.

14. The air conditioning apparatus for the hydraulic shovel according to claim 8, further comprising a vent hole through which outside air is introduced into said air-conditioning unit, and which is provided at an upper region of said right side wall above an external cover for covering tanks of the hydraulic shovel including at least a working fluid tank.

15. An air-conditioning apparatus for a cab of a construction vehicle, said apparatus comprising:
    an air-conditioning unit which is mounted to a front portion of a right side wall of the cab, and which is provided to be fitted into an opening that penetrates through said right side wall of said cab such that the air-conditioning unit constitutes a part of a surface of said right side wall and such that a part of an outer side of a case of the air conditioning unit protrudes outward from said right side wall;
    an internal cover that covers the air-conditioning unit in an interior of the cab; and
    an outside air duct through which air is introduced from outside of the cab through the right wall.

16. The air-conditioning apparatus according to claim 15, wherein the air-conditioning unit is mounted to the right wall to be removable from both inside and outside of the cab.

17. The air-conditioning apparatus according to claim 15, wherein the air-conditioning unit comprises pipe connecting portions provided at a region thereof exposed to outside of the cab.

18. The air-conditioning apparatus according to claim 15, wherein the cover has an inclined shape such that an upper portion thereof at a front side of the vehicle is inclined downward toward the front side.

19. The air-conditioning apparatus according to claim 15, wherein the cover comprises ducts for distributing air blown from the air-conditioning unit.

20. The air-conditioning apparatus according to claim 15, wherein a vent hole through which the outside air is introduced through the outside air vent is provided at an upper region of the right wall above an external cover for covering tanks of the vehicle including at least a working fluid tank.

21. The air-conditioning apparatus according to claim 15, wherein the air-conditioning unit comprises a heat exchange chamber at a front portion thereof and an outside air introduction chamber at a rear portion thereof;
wherein the outside air introduction chamber is separated from the heat exchange chamber by a partition wall, and the outside air introduction chamber communicates with the heat exchange chamber through a hole in the partition wall.

22. The air-conditioning apparatus according to claim 21, further comprising an interior air introduction hole formed in a side surface of the heat exchange chamber, wherein air from inside the cab is introduced to the air-conditioning unit through the interior air introduction hole.

23. The air-conditioning apparatus according to claim 15, wherein the outside air duct is coupled to an outside air duct placement portion of the internal cover.

24. An air-conditioning apparatus for a cab of a construction vehicle, said apparatus comprising:
an air-conditioning unit positioned at a front portion of a right side of the cab such that the air-conditioning unit constitutes a part of a surface of a right wall of the cab;
wherein a vent hole through which outside air is introduced into said air-conditioning unit is provided at an upper region of the right wall of the cab above an external cover for covering tanks of the vehicle including at least a working fluid tank.

25. The air-conditioning apparatus according to claim 24, wherein the air-conditioning unit is mounted to the right wall to be removable from both inside and outside of the cab.

26. The air-conditioning apparatus according to claim 24, wherein the air-conditioning unit comprises pipe connecting portions provided at a region thereof exposed to outside of the cab.

27. The air-conditioning apparatus according to claim 24, wherein the air-conditioning unit has an inclined shape such that an upper portion thereof at a front side of the vehicle is inclined downward toward the front side.

28. The air-conditioning apparatus according to claim 24, further comprising an air-conditioning unit cover, which has an inclined shape such that an upper portion thereof at a front side of the vehicle is inclined downward toward the front side.

29. The air-conditioning apparatus according to claim 24, further comprising an internal cover for the air-condition unit, wherein the internal cover comprises ducts for distributing air blown from the air-conditioning unit.

* * * * *